(12) United States Patent
Coen et al.

(10) Patent No.: US 6,250,459 B1
(45) Date of Patent: Jun. 26, 2001

(54) CONVEYOR CHAIN

(75) Inventors: Daniele Coen, Reggio Emilia; Piero Mondello, Buguggiate, both of (IT)

(73) Assignee: Rexnord Marbett S.p.A. (IT)

( * ) Notice: Subject to any disclaimer, the term of this patent is extended or adjusted under 35 U.S.C. 154(b) by 0 days.

(21) Appl. No.: 09/444,935

(22) Filed: Nov. 22, 1999

(30) Foreign Application Priority Data

Aug. 23, 1999 (EP) .................................................. 99830529

(51) Int. Cl.[7] .................................................. B65G 17/06
(52) U.S. Cl. .................................................................. 198/852
(58) Field of Search ........................... 198/850, 851, 198/852, 853

(56) References Cited

U.S. PATENT DOCUMENTS

| | | | |
|---|---|---|---|
| D. 263,211 | 3/1982 | Brooks et al. ..................... | D34/29 |
| D. 263,292 | 3/1982 | Brooks et al. ..................... | D34/29 |
| 1,191,434 | 7/1916 | Keith . | |
| 1,424,850 | 8/1922 | Purcell . | |
| 1,804,701 | 5/1931 | Mojonnier . | |
| 1,839,072 | 12/1931 | Woodman . | |
| 1,841,592 | 1/1932 | Edwards . | |
| 1,866,318 | 7/1932 | Muhlenbruch . | |
| 1,965,285 | 7/1934 | Gilstad .............................. | 74/246 |
| 2,009,157 | 7/1935 | Zilles et al. ...................... | 198/189 |
| 2,297,813 | 10/1942 | Stork ................................ | 198/189 |
| 2,319,617 | 5/1943 | Manierre ......................... | 198/189 |
| 2,586,268 | 2/1952 | Smith ............................... | 74/246 |
| 2,649,812 | 8/1953 | Wylie ............................... | 74/246 |
| 2,695,095 | 11/1954 | Anderson ........................ | 198/189 |
| 2,766,635 | 10/1956 | Schwarzkopf .................. | 74/246 |
| 3,107,777 | 10/1963 | Steorts, Jr. ...................... | 198/189 |
| 3,334,726 | 8/1967 | Fredrikson ...................... | 198/189 |
| 3,768,631 | 10/1973 | Wahren ........................... | 198/189 |
| 3,880,276 | 4/1975 | Willett, III ...................... | 198/193 |
| 3,952,860 | 4/1976 | Specht ............................. | 198/189 |
| 3,983,989 | 10/1976 | Wahren ........................... | 198/778 |
| 4,004,682 | 1/1977 | Schuler ........................... | 198/852 |
| 4,153,152 | 5/1979 | Lapeyre ........................... | 198/851 |
| 4,458,806 | 7/1984 | Weihe et al. .................... | 198/648 |
| 4,597,492 | 7/1986 | Lachonius et al. ............. | 198/852 |
| 4,682,687 | 7/1987 | Leege et al. .................... | 198/852 |
| 4,715,286 | 12/1987 | Parker et al. .................... | 104/88 |
| 4,751,999 | 6/1988 | Opperhauser ................... | 198/778 |
| 4,893,709 | 1/1990 | Schroeder et al. ............. | 198/852 |
| 4,895,248 | 1/1990 | Wahren ........................... | 198/852 |
| 5,009,630 | 4/1991 | Kanehira et al. ............... | 474/211 |
| 5,076,422 | 12/1991 | Clopton ........................... | 198/838 |
| 5,402,880 | 4/1995 | Murphy ........................... | 198/852 |
| 5,404,997 | 4/1995 | Schreier et al. ................ | 198/779 |
| 5,459,993 | 10/1995 | Kuriyama et al. ............. | 59/4 |
| 5,803,236 | 9/1998 | Wahren ........................... | 198/852 |
| 6,173,832 * | 1/2001 | Lockayne ........................ | 198/852 |

FOREIGN PATENT DOCUMENTS

| | | | |
|---|---|---|---|
| 934690 | 10/1973 | (CA) ................................ | 198/100 |
| 2020107 | 4/1970 | (DE) . | |
| 0323819A1 | 7/1989 | (EP) ................................. | B65G/17/06 |
| 1095233 | 5/1955 | (FR) . | |

(List continued on next page.)

Primary Examiner—James R. Bidwell
(74) Attorney, Agent, or Firm—Quarles & Brady LLP

(57) ABSTRACT

A conveyor chain for conveying products comprises a plurality of links, each link having a body defining a supporting surface for the products that are to be conveyed. Two adjacent links in the plurality of links are hinged to each other by a spindle of predetermined axis parallel to the supporting surface and extending between side projections of a first link and a central projection of a second link. The two adjacent links are articulated together by a hinge pin on a predetermined axis intersecting the axis of the spindle and perpendicular to the supporting surface. The spindle passes through the hinge pin which is rotatable in a seat formed in the central projection of the second link. A flat part is housed in a depression in the body of the second link, is rotatable about the axis of the hinge pin and is fastened axially to the body of the second link by retention means.

7 Claims, 5 Drawing Sheets

FOREIGN PATENT DOCUMENTS

| | | | |
|---|---|---|---|
| 2564810 | 11/1985 | (FR) | B65G/17/38 |
| 54-151286 | 11/1979 | (JP) | B65G/17/38 |
| 61-90906 | 7/1994 | (JP) | B65G/17/38 |
| 8-91530 | 4/1996 | (JP) | B65G/17/38 |
| WO94/26636 | 11/1994 | (WO) | B65G/17/08 |
| WO97/39966 | 10/1997 | (WO) | B65G/1/08 |

* cited by examiner

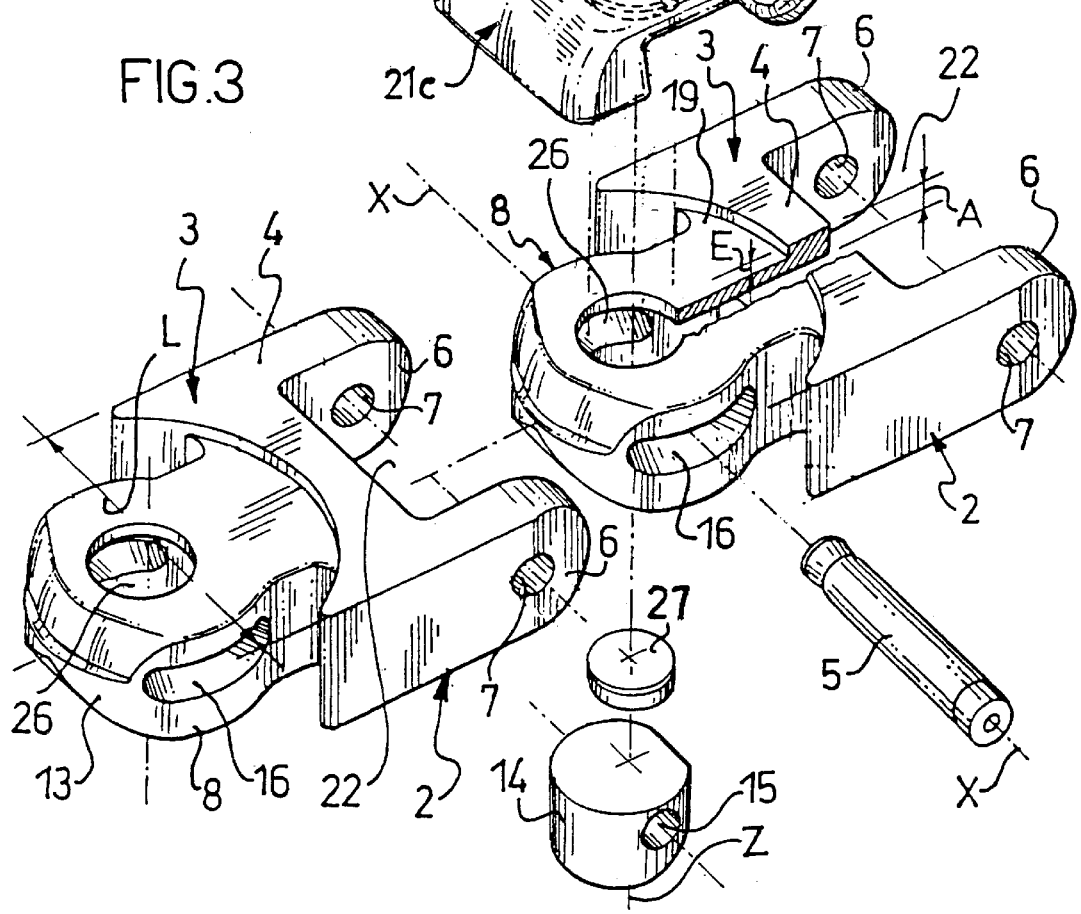

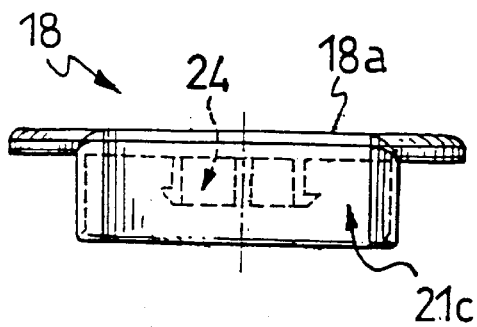
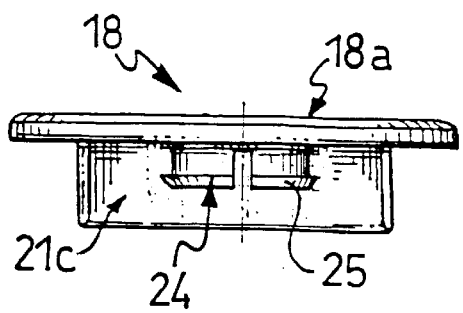
FIG.7    FIG.8
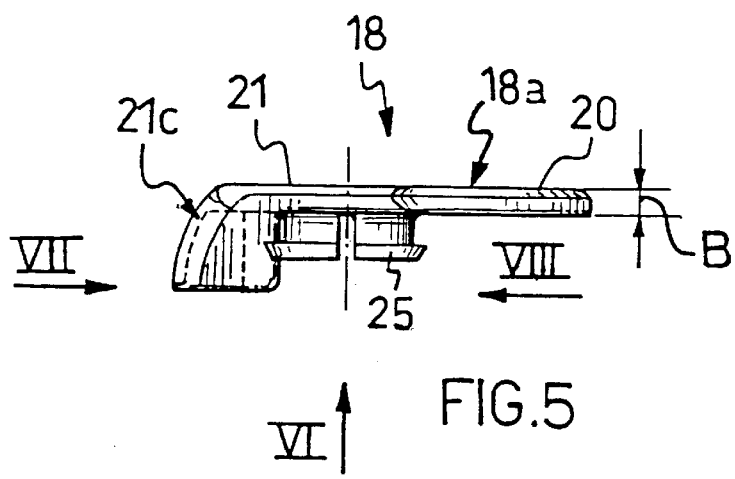
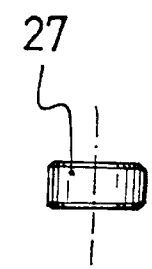
FIG.5    FIG.9
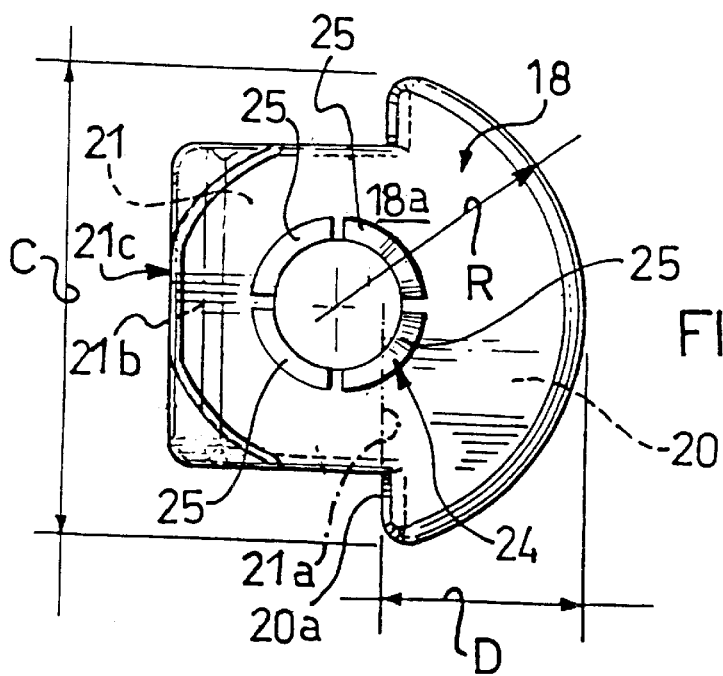
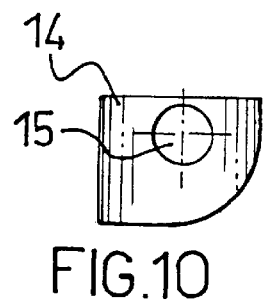
FIG.10
FIG.6

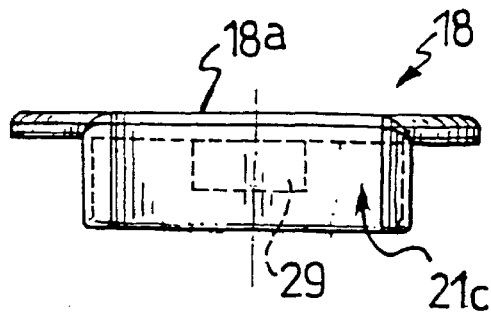
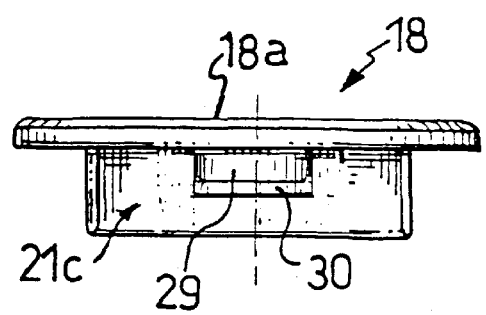
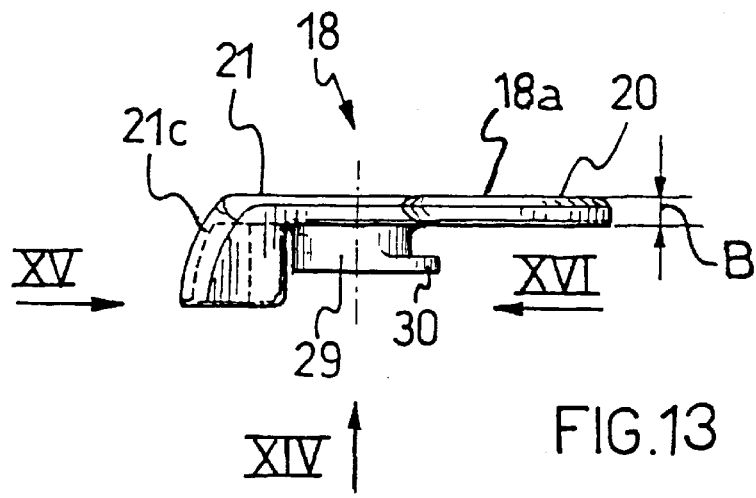
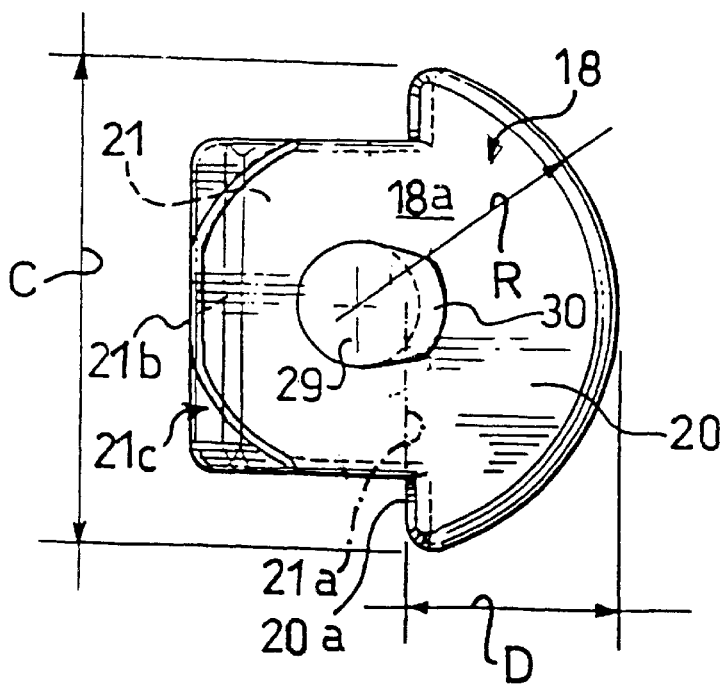

CONVEYOR CHAIN

DESCRIPTION

1. Field of the Invention

The present invention relates to a conveyor chain for conveying products, of the type that comprises a plurality of links, each link having a body defining a supporting surface for the products that are to be conveyed, two adjacent links in the plurality of links being hinged to each other by a spindle of predetermined axis parallel to the supporting surface and extending between side projections of a first link of the two links and a central projection of a second link of the two links, these two links being articulated together by a hinge pin on a predetermined axis intersecting the axis of the spindle and perpendicular to the supporting surface, the spindle passing through this hinge pin which is rotatable in a seat formed in the central projection of the second link.

2. Background of the Invention

As is known, with such chains it is possible to follow twisting paths because of the fact that the links are hinged together. This feature of known chains of this type does however create a discontinuity in the supporting surface. What is more, gaps open up on either side of the chain and simultaneously and alternatively close and open when the chain changes direction. When these gaps close any object or, worse still, any finger which happens to be in the open gap can unfortunately be trapped. This of course leads to the drawback of undesirable jamming or, worse, injury.

Conveyor chains have been suggested in which these gaps are permanently occupied by plates mounted on the first link and projecting from the side projections. These plates fit into slots formed in the body of the second link. Such chains, though satisfactory, do not altogether solve the problem because it is still possible for an object or a finger to be squeezed between the links, even if not completely inserted into the gap, which is partially occupied by the plate, when the remaining gap closes; and besides, the continuity of the supporting surface is compromised.

The problem addressed by the present invention is how to devise a conveyor chain of the type specified that will have the structure and functional characteristics to overcome the abovementioned problem cited with reference to the conveyor chains of the prior art.

SUMMARY OF THE INVENTION

This problem is solved by a conveyor chain of the type specified that is characterized in that it comprises a flat part which is housed in a depression in the body of the second link, is rotatable about the axis of the hinge pin and is fastened axially to the body of the second link by retention means, the said flat part having a semicircular portion that rotates in the depression and a rectangular portion continuing from the second link and held between the side projections of the first link.

Other features and the advantages of the conveyor chain of the present invention will become clear in the course of the description given below of a preferred embodiment, presented by way of non-restrictive illustration, with reference to the accompanying figures, in which:

BRIEF DESCRIPTION OF THE DRAWINGS

FIG. 3 is a perspective view, with the parts detached, of a detail of the conveyor chain seen in FIG. 1, FIG. 4 is a side view in cross section of a detail of the chain of FIG. 1, FIGS. 5, 6, 7 and 8 are orthogonal views of a detail of the conveyor chain of FIG. 1 seen from the side, in plan view and from each end, respectively, FIG. 9 is a side view of another detail of the chain seen in FIG. 1, FIG. 10 is a side view of yet another detail of the chain seen in FIG. 1.

DETAILED DESCRIPTION OF THE PREFERRED EMBODIMENT

Figure 1:
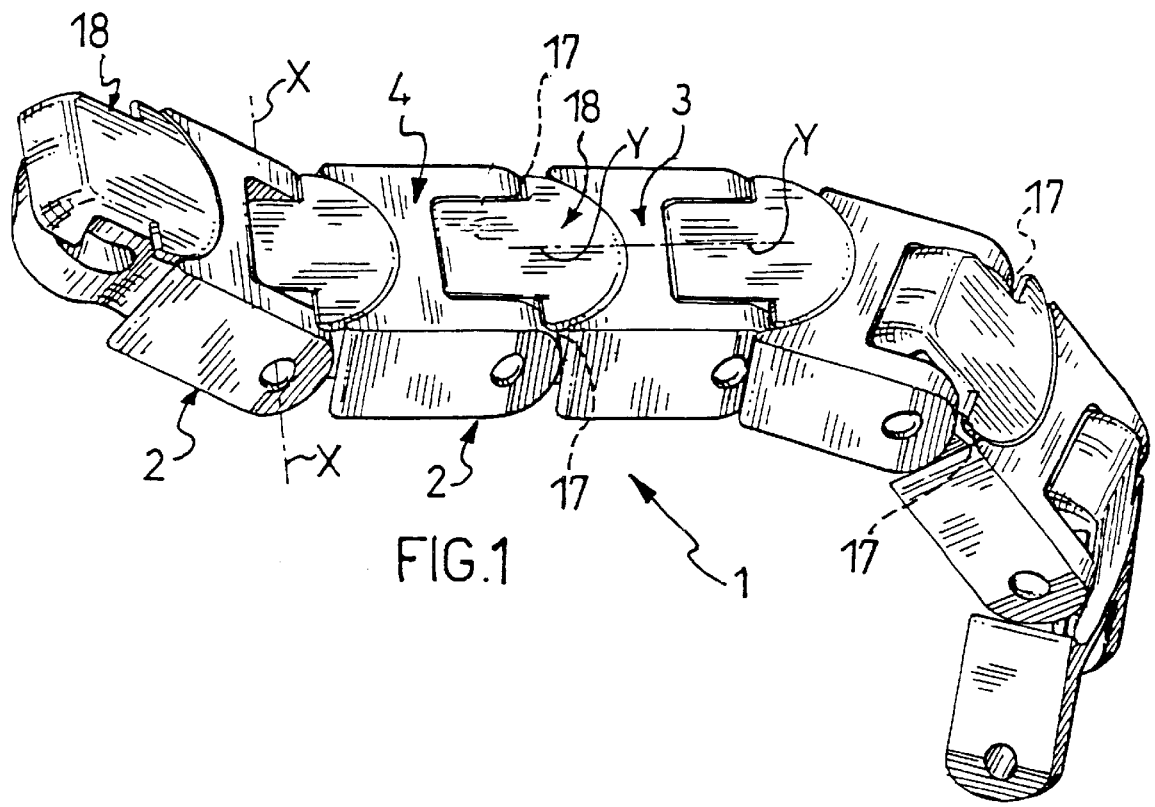
FIG. 1 is a perspective view of a conveyor chain according to the present invention.
Figure 2:
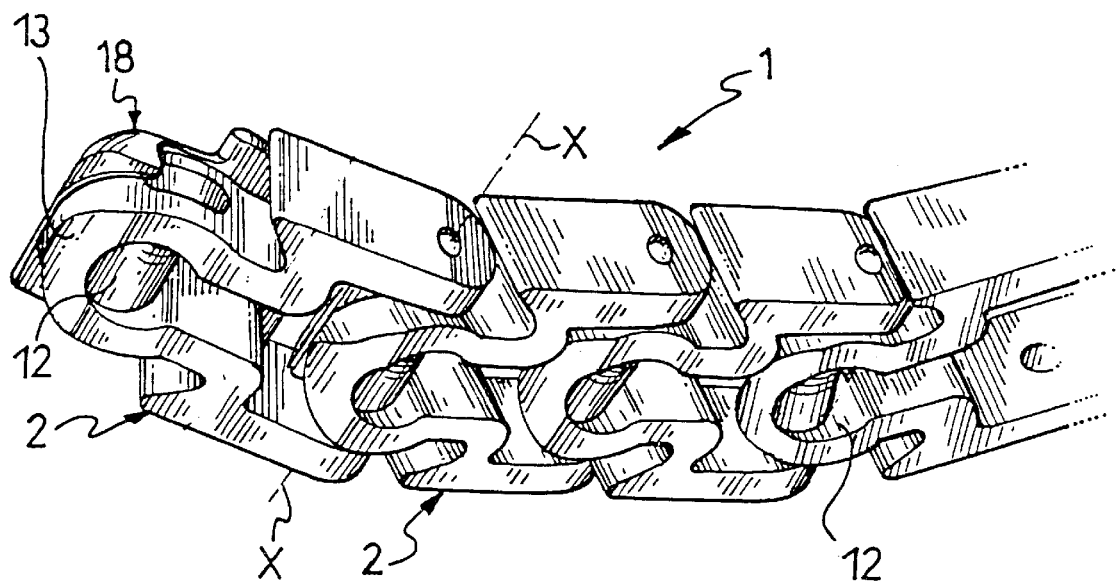
FIG. 2 is a perspective view of the conveyor chain of FIG. 1, seen from a different angle.

With reference to the accompanying figures, the number 1 is a general reference for a conveyor chain for conveying products.

The chain 1 comprises a plurality of identical links, all labelled 2.

Each link 2 has a body 3 defining a supporting surface 4 for the support of the products that are to be conveyed.

Within the chain 1, two links 2, adjacent to each other in the plurality of links, are hinged to each other by a spindle 5, which has an axis X—X parallel to the supporting surface 4 and perpendicular to the direction Y—Y of travel of the chain.

The spindle 5 extends between side projections (both labelled 6 and each having a hole 7 for this purpose) belonging to a first link of the two adjacent links, and a central projection 8 belonging to a second link of the two adjacent links (having for this purpose a passage with the general reference 9).

The body 3 of each link 2 comprises a flat portion 10 presenting an upper surface 10a which is the abovementioned supporting surface 4. The flat portion 10 has a thickness A; beneath the flat portion 10 is a space 11 for a sprocket tooth (not shown) at either the drive or the idle end of the chain.

It should be observed that two adjacent links in the plurality of chain links are furthermore articulated together so that the chain can follow irregular paths, i.e. can so to speak follow or steer its way around curved parts.

In other words the two adjacent chain links can rotate relative to each other about an axis Z—Z which intersects with axis X—X and is perpendicular to the supporting surface 4.

For this purpose the central projection 8 contains, underneath the flat portion 10, a cylindrical seat 12 of axis Z—Z, which defines in the said central projection a sleeve 13 which is also of axis Z—Z.

The cylindrical seat 12 houses a rotatable cylindrical hinge pin 14 of axis Z—Z enclosed by the sleeve 13.

A hole 15, formed through the hinge pin 14, and opposing slots 16 formed in opposite walls of the sleeve 13 together form the abovementioned passage 9 through which the spindle 5 extends.

The side projections 6 in practice form a fork that encloses the central projection 8. Between the ends of the side projections 6 of one link and the body 3 of the next link, are respective gaps 17, large enough to allow one link to rotate with respect to the other about the axis Z—Z, in other words to enable the chain to flex and follow the desired curvature required by the path.

In order to prevent a foreign body or a finger from occupying a gap 17, the conveyor chain 1 according to the present invention comprises, for each link 2, a flat part 18 which is housed in a depression 19 let into the flat portion 10.

More specifically, the depression 19 has a depth E sufficient to accommodate the flat part 18, which has a depth B approximately equal to the depth E. In this way the flat part 18 has a surface 18a that is coplanar with the surface 10a and is likewise part of the supporting surface 4.

More specifically, the flat part 18 comprises a portion 20 which is essentially a segment of a circle of predetermined radius R, its centre being on the axis Z—Z. The portion in the shape of a segment of a circle 20 has a base 20a of length C extending in the direction of the width of the chain and approximately equal to the width L of the chain, and a height D equal to about three quarters of the radius R. The portion in the shape of a segment of a circle 20 thus covers the gaps 17.

The flat part 18 also includes a rectangular portion 21 coplanar with the portion 20 in the shape of a segment of a circle and having one side 21a adjacent to the base 20a of the portion in the shape of a segment of a circle 20. This rectangular portion 21 is inserted with limited play in a rectangular seat 22 formed in the flat portion 10 of the adjacent link, between the two side projections 6.

When the chain flexes, the side projections 6 cause the rectangular portion 21, and hence the entire flat part 18, to rotate about the axis Z—Z.

On the opposite side 21b from the side 21a the rectangular portion 21 has a slope 21c. The said slope 21c is in the form of an arc of a cylinder whose axis coincides with the axis X—X of the spindle 5. It prevents gaps opening up undesirably in the supporting surface 4 when the chain bends.

The flat part 18, which can rotate about the axis Z—Z with respect to the body 3 of its link 2, is fixed axially to the said body 3 by retention means under the general reference 23.

The retention means 23 in practice are basically press-stud means 24 comprising four hooked projections 25 arranged circumferentially about the axis Z—Z. These are designed to be pushed through a hole 26 in the flat portion 10 and locked under a surface 10b of the flat portion 10 on the other side from the surface 10a.

A locking insert 27 in the form of a disc is advantageously inserted forcibly in the manner of a bung between the hooked projections 25, thus making the retention of the flat part 18 in the body 3 of the link by the press-stud means effectively irreversible.

It should be observed that the body 3 of each link and the flat part 18 are made of the same material as each other, preferably a plastic anti-friction material, such as a Teflon-coated acetal resin.

As regards the hinge pin 14, this is made from a different plastic material to that used for the body 3 and for the flat part 18. For the hinge pin 14, use is preferably made of a wear-resistant plastic material such as a polyamide.

Figure 12:
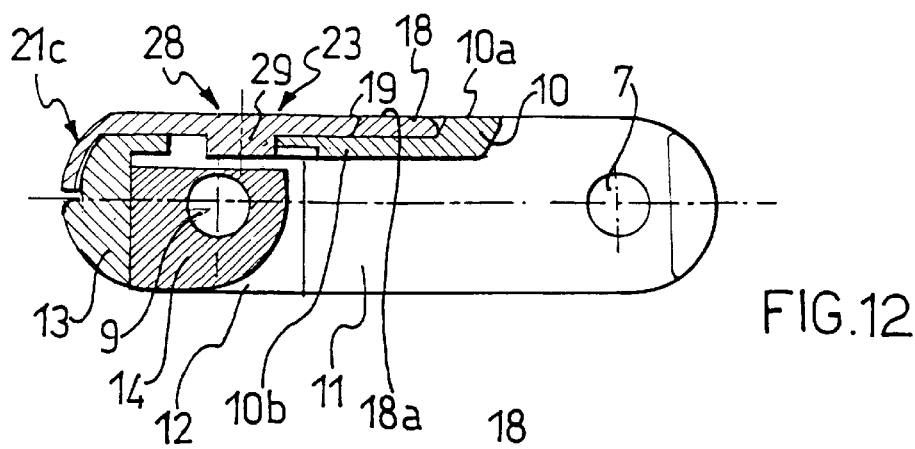
FIG. 12 is a side view in section of a detail of the conveyor chain seen in FIG. 11, and FIGS. 13, 14, 15 and 16 are orthogonal views of a detail of the conveyor chain seen in FIG. 11, in side view, in plan view and from each end, respectively.
Figure 11:
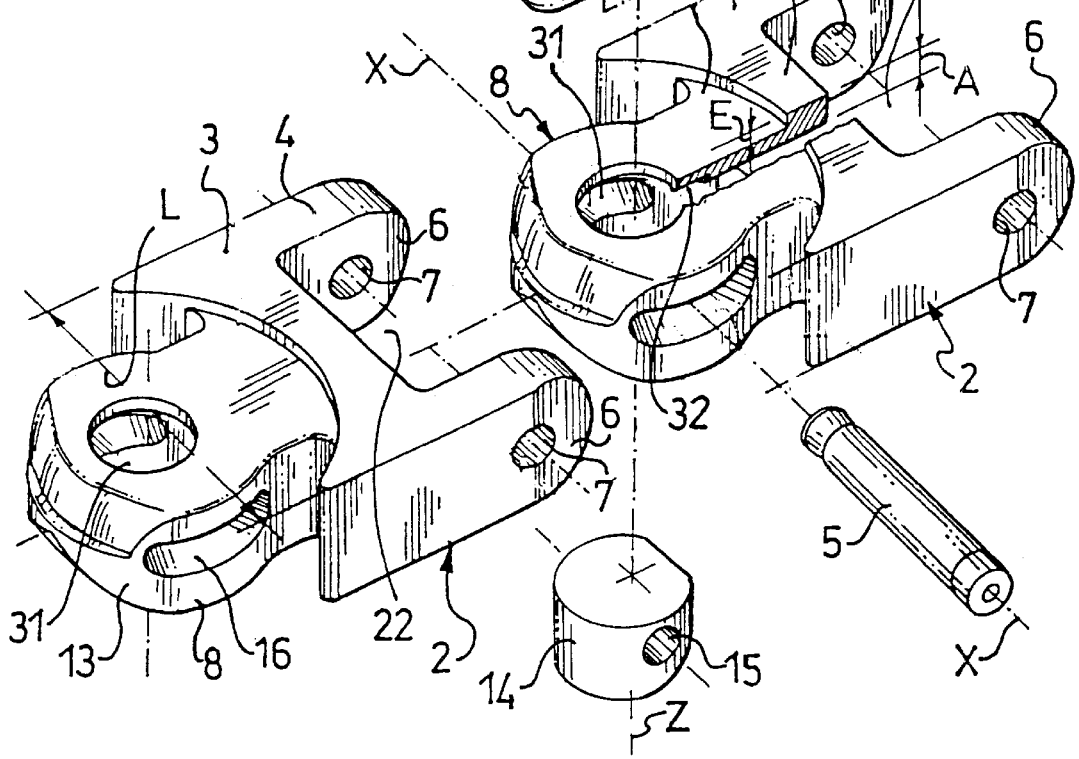
FIG. 11 is a perspective view, with the parts detached, of a conveyor chain according to the present invention, in accordance with an alternative embodiment.

In one alternative embodiment of the same invention, a conveyor chain is illustrated in FIGS. 11 to 14, in which parts with the same structure and function are distinguished by the same reference numbers and are not further described below.

In the conveyor chain of FIGS. 11 to 14 the retention means 23 are a basically bayonet-type coupling 28 comprising a protrusion 29 extending along the axis Z—Z from the flat part 18 and having a radial tooth 30. The protrusion 29 can be passed through a hole 31 in the flat portion 10 and pushed sideways, that is at right angles to the axis Z—Z, with a Z-like movement so that the radial tooth 30 slots into a recess in the shape of a sector of a circle 32 formed in the flat portion 10 on surface 10b.

The recess in the shape of a sector of a circle 32 has sufficient angular width to allow the flat part 18 to rotate about the axis Z—Z when the chain is flexed.

During operation the continuity of the supporting surface 4 of the conveyor chain remains largely intact. This is because when there is flexing between adjacent links as happens when the direction of the path of the chain changes, the gaps that occur at the sides of the chain all open and close beneath the flat part and are made inaccessible both to objects and fingers.

The main advantage of the conveyor chain according to the present invention is in its completely safe operation, since it ensures continuity of the supporting surface even when the path of the chain changes direction. It cannot therefore be jammed by the introduction of a foreign body and cannot cause injury by the introduction of a finger.

Another advantage of the chain according to the present invention is that its links are remarkably robust and structurally sturdy.

Yet another advantage of the chain according to the present invention is that it combines low friction between the supporting surface and the products to be conveyed with very quiet operation and durability under the action of the driving and idle sprockets of the chain.

Still another advantage of the chain according to the present invention lies in the fact that it lends itself to easier replacement of the flat parts, should these break.

It will be obvious that, in order to satisfy various specific needs, a person skilled in the art will be able to make numerous modifications and alterations to the conveyor chain described above, all however keeping within the scope of protection of the invention as defined in the following claims.

We claim:

1. Conveyor chain for conveying products, of the type that comprises a plurality of links, each link having a body defining a supporting surface for the products that are to be conveyed, two adjacent links in the plurality of links being hinged to each other by a spindle of predetermined axis parallel to the supporting surface and extending between side projections of a first link of the two links and a central projection of a second link of the two links, these two links being articulated together by a hinge pin on a predetermined axis intersecting the axis of the spindle and perpendicular to the supporting surface, the spindle passing through this hinge pin which is rotatable in a seat formed in the central projection of the second link, wherein the said chain comprises a flat part which is housed in a depression in the body of the second link, is rotatable about the axis of the hinge pin and is fastened axially to the body of the second link by retention means, the said flat part having a portion in the shape of a segment of a circle that rotates in the depression and a rectangular portion continuing from the second link and held between the side projections of the first link.

2. Conveyor chain according to claim 1, wherein the retention means comprise basically press-stud means formed between the flat part and the body of the link.

3. Conveyor chain according to claim 2, wherein the press-stud means include a locking insert.

4. Conveyor chain according to claim 1, wherein the retention means comprise a basically bayonet-type coupling formed between the flat part and the body of the link.

5. Conveyor chain according to claim 1, wherein the body of the link and the flat part are made of the same material as each other, preferably a plastic anti-friction material, and in that the hinge pin is made of a different material, preferably a plastic wear-resistant material.

6. Conveyor chain according to claim 5, wherein the plastic wear-resistant material of the body of the link and of the flat part is a Teflon-coated acetal resin.

7. Conveyor chain according to claim 5, wherein the plastic wear-resistant material of the hinge pin is a polyamide.

* * * * *